US008318870B2

(12) United States Patent
Haufe et al.

(10) Patent No.: US 8,318,870 B2
(45) Date of Patent: Nov. 27, 2012

(54) EPOXIDE (METH) ACRYLATE COMPOSITION

(75) Inventors: Markus Haufe, Zurich (CH); Andreas Kramer, Zurich (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/007,234

(22) Filed: Jan. 14, 2011

(65) Prior Publication Data

US 2012/0022183 A1  Jan. 26, 2012

Related U.S. Application Data

(63) Continuation of application No. PCT/EP2009/059200, filed on Jul. 17, 2009.

(30) Foreign Application Priority Data

Jul. 17, 2008 (CH) .................................... 1119/08
Nov. 21, 2008 (EP) .................................... 08169630

(51) Int. Cl.
*C09J 4/02* (2006.01)

(52) U.S. Cl. .......... 525/531; 525/65; 525/119; 525/122; 525/407; 525/438; 525/454; 525/463; 525/476; 525/524; 525/529; 525/532

(58) Field of Classification Search .................. None
See application file for complete search history.

(56) References Cited

U.S. PATENT DOCUMENTS

| 4,755,571 A * | 7/1988 | Irving et al. .................. 525/532 |
| 6,187,836 B1 * | 2/2001 | Oxman et al. ................. 522/148 |
| 7,494,339 B2 * | 2/2009 | Dias et al. .................... 433/223 |
| 2002/0007027 A1 | 1/2002 | Wang et al. |
| 2003/0051610 A1 | 3/2003 | Dux et al. |
| 2006/0122352 A1 | 6/2006 | Burckhardt |
| 2006/0155045 A1 | 7/2006 | Tsuno et al. |

FOREIGN PATENT DOCUMENTS

| EP | 0 160 621 A2 | 11/1985 |
| EP | 0 355 043 A1 | 2/1990 |
| EP | 1 431 365 A1 | 6/2004 |
| EP | 1 433 814 A1 | 6/2004 |
| EP | 1431365 A1 * | 6/2004 |
| EP | 1 728 804 A1 | 12/2006 |
| JP | 2005-154573 A | 6/2005 |
| WO | WO 2007/096355 A1 | 8/2007 |

OTHER PUBLICATIONS

XP-002526589, Database WPI Week 200548 Thomson Scientific, London, GB; AN 2005-470689 XP002526589—& JP 2005-154573 A (Yokohama Rubber Co Ltd) Jun. 16, 2005.
Written Opinion of the International Searching Authority (form PCT/ISA/237) dated Jan. 15, 2010, and an English translation thereof, for PCT/EP2009/059200.

* cited by examiner

*Primary Examiner* — Robert Sellers
(74) *Attorney, Agent, or Firm* — Buchanan Ingersoll & Rooney PC

(57) ABSTRACT

The disclosure relates to a composition having at least one radically polymerisable monomer M; at least one radical former, at least one epoxide resin A including an average of more than one epoxide group per molecule, and at least one compound of formula (I). Such compositions are suitable as adhesives, sealants or coatings. Shortly after the application thereof, they have a high initial strength and, after further hardening at room temperature, they reach a high level of final strength.

21 Claims, No Drawings

EPOXIDE (METH) ACRYLATE COMPOSITION

RELATED APPLICATIONS

This application claims priority as a continuation application under 35 U.S.C. §120 to PCT/EP2009/059200, which was filed as an International Application on Jul. 17, 2009 designating the U.S., and which claims priority to Swiss Application No. 01119/08 filed in Switzerland on Jul. 17, 2008 and European Application No. 08169630.4 filed in Europe on Nov. 21, 2008. The entire contents of these applications are hereby incorporated by reference in their entireties.

FIELD

The disclosure relates to the field of polymerizable compositions based on epoxy resins and free-radically polymerizable monomers.

BACKGROUND INFORMATION

The use of both (meth)acrylate compositions and epoxy resins in adhesive, sealing and coating technology is widespread. (Meth)acrylate compositions are notable for a high early strength and rapid curing, and epoxy resins are notable for a high final strength.

In order to utilize advantages of both technologies, hybrid systems comprising (meth)acrylates and epoxides are produced. Such hybrid systems are described, for example, in EP 1 431 365 A1 and EP 0 160 621 A1. With these compositions, an elevated temperature in the range from about 120 to 150° C. is needed for the curing of the epoxy resin, and they are thus unsuitable for thermally sensitive substrates.

There is a further reason not to use heat-curing compositions, for example, in applications including those where the composition is applied over a large area, and where the substrate provided with the composition, owing to its dimensions, cannot directly be heated homogeneously and simultaneously over the entire area, for example in an oven, such that the composition could cure. This is the case, for example, with large-area coatings, such as in the case of floor coverings. Uneven heating and the associated uneven curing of heat-curing compositions can lead in such a case to stresses within the cured composition.

Known heat-curing compositions are likewise unsuitable for the adhesive bonding of substrates with different coefficients of thermal expansion, since they have different contractions as they are cooled after the curing of the adhesive, which can result in unfavorable stresses in the adhesive bond.

The hardeners known to date for epoxy resins, such as aliphatic amines, which enable curing of the epoxy resin even at room temperature are unsuitable for use in a hybrid system comprising (meth)acrylates and epoxides, because they inhibit the free-radical polymerization reaction of the (meth) acrylate monomers and hence an optimal early strength is not achieved.

SUMMARY

A composition comprising:
a) at least one free-radically polymerizable monomer M;
b) at least one free-radical former;
c) at least one epoxy resin A which has an average of more than one epoxy group per molecule; and
d) at least one compound of the formula (I):

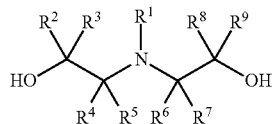

where the $R^1$ radical is a hydrocarbyl radical having 1 to 6 carbon atoms; the $R^3$, $R^4$, $R^5$, $R^6$, $R^7$ and $R^8$ radicals are each independently a hydrogen atom or a hydrocarbyl radical having 1 to 6 carbon atoms; and the $R^2$ and $R^9$ radicals are each independently a hydrogen atom or a hydrocarbyl radical having 1 to 6 carbon atoms or a radical of the formula (II):

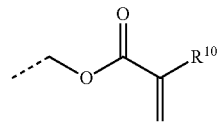

where the $R^{10}$ radical is a hydrogen atom or a methyl group.

DETAILED DESCRIPTION

A composition is disclosed which has a high early strength shortly after it has been applied and attains a high final strength after further curing at room temperature.

Exemplary embodiments are directed to the novel use of exemplary specific compounds as a hardener for an epoxy resin, such that a free-radical polymerization reaction can set in immediately after the application of the composition and proceed without inhibition, and such that a high early strength can be achieved. At the same time, exemplary embodiments of the specific compound enable the complete curing of the epoxy resin without additionally supplying energy to the system in any way, such that no further heat need be supplied to the composition for curing and/or for post-curing.

Exemplary embodiments of the disclosure relate, in a first aspect, to a composition comprising:
a) at least one free-radically polymerizable monomer M;
b) at least one free-radical former;
c) at least one epoxy resin A which has an average of more than one epoxy group per molecule; and
d) at least one compound of the formula (I):

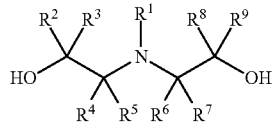

In this formula, the $R^1$ radical is a hydrocarbyl radical having 1 to 6 carbon atoms, such as an ethyl or a methyl group.

The $R^3$, $R^4$, $R^5$, $R^6$, $R^7$ and $R^8$ radicals are each independently a hydrogen atom or a hydrocarbyl radical having 1 to 6 carbon atoms, especially an ethyl or a methyl group. Preferably, the $R^3$, $R^4$, $R^5$, $R^6$, $R^7$ and $R^8$ radicals are, for example, each a hydrogen atom.

The $R^2$ and $R^9$ radicals are each independently a hydrogen atom or a hydrocarbyl radical having 1 to 6 carbon atoms such as an ethyl or a methyl group, or a radical of the formula (II):

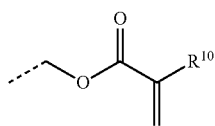

(II)

where the $R^{10}$ radical is a hydrogen atom or a methyl group. Preferably, the $R^2$ and/or $R^9$ radicals are, for example, a radical of the formula (II).

Substance names beginning with "poly", for example polyisocyanate, polyurethane, polyester or polyol, refer in the present document to substances which, in a formal sense, contain two or more of the functional groups which occur in their name per molecule.

In the present document, the term "polymer" firstly embraces a collective of macromolecules which are chemically homogeneous but differ in relation to degree of polymerization, molar mass and chain length, which has been prepared by a poly reaction (polymerization, polyaddition, polycondensation). The term secondly also embraces derivatives of such a collective of macromolecules from poly reactions (e.g., compounds which have been obtained by reactions, for example additions or substitutions, of functional groups onto given macromolecules, and which may be chemically homogeneous or chemically inhomogeneous). The term also embraces what are known as prepolymers (i.e., reactive oligomeric preliminary adducts whose functional groups are involved in the formation of macromolecules).

In the present document, the term "polymeric polyol" embraces any polymer as defined above which has more than one hydroxyl group. Accordingly, the term "polymeric diol" embraces any polymer which has exactly two hydroxyl groups.

The term "polyurethane polymer" embraces all polymers which are prepared by what is known as the diisocyanate polyaddition process. This also includes those polymers which are virtually or entirely free of urethane groups. Examples of polyurethane polymers are polyether polyurethanes, polyester polyurethanes, polyether polyureas, polyureas, polyester polyureas, polyisocyanurates and polycarbodiimides.

The term "solid epoxy resin" is very well known to those skilled in the art of epoxides and is used in contrast to "liquid epoxy resin". The glass transition temperature $T_g$ of the solid epoxy resins is above room temperature, 23° C., which means that they can be comminuted at room temperature to free-flowing particles.

In the present document, the term "bifunctional" relates to monomers and generally to molecules which have two different types of chemically reactive functional groups. For example, a bifunctional monomer has both a free-radically polymerizable group and a group reactive with epoxy resins.

In contrast, the term "difunctional" relates to molecules which have two identical, chemically reactive functional groups or two functional groups of the same type. For example, a difunctional molecule has two hydroxyl groups.

In the present document, the term "diphenol" refers to monocyclic, polycyclic and fused aromatics and heteroaromatics which have two phenolic hydroxyl groups.

In the present document, "molecular weight" is always understood to mean the number-average molecular weight $M_n$.

Suitable free-radically polymerizable monomers M are especially vinyl esters, (meth)acrylic esters, acrylamides or styrene.

For example, suitable free-radically polymerizable monomers M are selected from the group consisting of vinyl acetate, methyl (meth)acrylate, ethyl (meth)acrylate, n- and i-butyl (meth)acrylate, hexyl (meth)acrylate, 2-ethylhexyl (meth)acrylate, isodecyl (meth)acrylate, cyclohexyl (meth)acrylate, 3-tetra-hydrofuryl (meth)acrylate, isobornyl (meth)acrylate, norbornyl (meth)acrylate, trimethylcyclohexyl (meth)acrylate, benzyl (meth)acrylate, 2-hydroxyethyl (meth)acrylate, 2- and 3-hydroxypropyl (meth)acrylate, tetrahydrofurfuryl (meth)acrylate, 2-(2-ethoxyethoxy)ethyl (meth)acrylate, butyldiglycol (meth)acrylate, isotridecyl (meth)acrylate, lauryl (meth)acrylate, stearyl (meth)acrylate, phenoxyethyl (meth)acrylate, dicyclopentadienyloxyethyl (meth)acrylate, dihydrodicyclopentadienyl (meth)acrylate, and ethoxylated nonylphenol (meth)acrylate.

The free-radically polymerizable monomer M is preferably, for example, a methacrylate, especially selected from the group consisting of methyl methacrylate (MMA), tetrahydrofurfuryl methacrylate (THFMA), cyclohexyl methacrylate (CHMA), isobornyl methacrylate (IBMA) and trimethylcyclohexyl methacrylate (TMCHMA).

Further suitable free-radically polymerizable monomers M are crosslinking monomers, for example allyl (meth)acrylate or crosslinking difunctional (meth)acrylates, for example oligomeric or polymeric compounds of the formula (III):

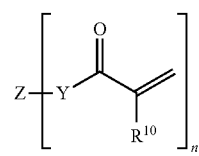

(III)

In this formula, the $R^{10}$ radical is as already described above. The index n is a value from 2 to 5. In addition, Z is a polyol after removal of n hydroxyl groups and Y is O or NR' where R' is a hydrocarbyl radical or a hydrogen atom, preferably a hydrogen atom.

The compound of the formula (III) is, for example, selected from the group consisting of ethylene glycol di(meth)acrylate, 1,3- and 1,4-butanediol di(meth)acrylate, 1,6-hexanediol di(meth)acrylate, ethoxylated and propoxylated neopentyl glycol di(meth)acrylate, propoxylated glyceryl tri(meth)acrylate, trimethylolpropane tri(meth)acrylate, trimethylolpropane di(meth)acrylate, ethoxylated trimethylolpropane tri(meth)acrylate, modified pentaerythrityl tri(meth)acrylate, propoxylated ethoxylated pentaerythrityl tetra(meth)acrylate, ditrimethylolpropane tetra(meth)acrylate and dipentaerythrityl penta(meth)acrylate.

For example, n in the compound of the formula (III) is a value of 2 and Z is a polymeric polyol after removal of two OH groups. This polymeric polyol, for example, a polyalkylenepolyol, a polyoxyalkylenepolyol or a polyurethanepolyol; a poly-hydroxy-functional ethylene-propylene-diene or ethylene-butylene-diene or ethylene-propylene-diene copolymer; a poly-hydroxy-functional copolymer formed from dienes such as 1,3-butadiene or diene mixtures and vinyl monomers such as styrene, acrylonitrile or isobutylene; a poly-hydroxy-functional polybutadienepolyol; a poly-hydroxy-functional acrylonitrile/butadiene copolymer; or a polysiloxanepolyol.

For example, such difunctional (meth)acrylates are selected from the group consisting of polyethylene glycol di(meth)acrylate, such as diethylene glycol di(meth)acrylate, triethylene glycol di(meth)acrylate, tetraethylene glycol di(meth)acrylate; polypropylene glycol di(meth)acrylate such as dipropylene glycol di(meth)acrylate, tripropylene glycol di(meth)acrylate; and tris(2-hydroxyethyl)isocyanurate tri(meth)acrylate.

Additionally suitably, Z is a diphenol, for example, an alkoxylated diphenol, after removal of two OH groups, preferably ethoxylated bisphenol A. For example, such a difunctional (meth)acrylate is commercially available under the Sartomer® SR 348 tradename from Sartomer Company, Inc., USA.

Additionally suitable as free-radically polymerizable monomers M are also difunctional (meth)acrylates such as epoxy (meth)acrylates, for example, epoxy (meth)acrylates obtainable from the reaction of bisphenol A diglycidyl ether with (meth)acrylic acid. For example, such a difunctional (meth)acrylate is commercially available under the Sartomer® CN 104 tradename from Sartomer Company, Inc., USA.

Suitable poly-hydroxyl-terminated acrylonitrile/butadiene copolymers can be prepared from carboxyl-terminated acrylonitrile/butadiene copolymers which are commercially available, for example, under the Hypro® (formerly Hycar®) CTBN name from Emerald Performance Materials, LLC, USA, and epoxides or amino alcohols.

Such suitable free-radically polymerizable monomers M of the formula (III) are commercially available, for example, from Kraton Polymers, USA, or under the Hypro® VTB and Hypro® VTBNX tradenames from Emerald Performance Materials, LLC, USA.

The free-radically polymerizable monomer M of the formula (III) is, for example, a polyurethane (meth)acrylate. Such compounds are preparable, in manners known to those skilled in the art, from the reaction of at least one polyisocyanate, especially a diisocyanate, and a (meth)acrylic acid, a (meth)acrylamide or a (meth)acrylic ester which has a hydroxyl group. The diisocyanate can optionally, before the reaction with (meth)acrylic acid, a (meth)acrylamide or a (meth)acrylic ester which has a hydroxyl group, be reacted with at least one polyol P, such as a diol, in a process known to those skilled in the art to give a polyurethane polymer having isocyanate groups.

Suitable for reaction with the isocyanate groups of the polyisocyanate are, for example, hydroxyalkyl (meth)acrylate such as hydroxypropyl acrylate (HPA), hydroxypropyl methacrylate (HPMA), hydroxybutyl acrylate (HBA) or hydroxybutyl methacrylate (HBMA), preferably hydroxyethyl acrylate (HEA) or hydroxyethyl methacrylate (HEMA), or a monohydroxy poly(meth)acrylate of a polyol, preferably of, for example, glycerol or trimethylolpropane.

Polyurethane (meth)acrylates can likewise be prepared by esterification of a polyurethane polymer having hydroxyl groups with (meth)acrylic acid.

In addition, polyurethane (meth)acrylates can be prepared by the reaction of a (meth)acrylic ester which has at least one isocyanate group with a polyurethane polymer having hydroxyl groups or with a polyol as described, for example, in the present document. An example of a suitable (meth)acrylic ester which has at least one isocyanate group is 2-isocyanatoethyl methacrylate.

Suitable diisocyanates are in principle all diisocyanates. The following are mentioned by way of example: 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3-diisocyanate, cyclohexane 1,4-diisocyanate, 1-isocyanato-3,3,5-trimethyl-5-isocyanatomethylcyclo-hexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene, 2,4- and 2,6-tolylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1, 4-diisocyanatobenzene, naphthalene 1,5-diisocyanate (NDI), 3,3'-dimethyl-4,4'-diisocyanatodiphenyl (TODI); oligomers and polymers of the aforementioned isocyanates, and any desired mixtures of the aforementioned isocyanates.

Preferred exemplary polyols P are polyoxyalkylenepolyols, also known as "polyether polyols", polyester polyols, polycarbonate polyols and mixtures thereof. Most preferred polyols include diols, especially polyoxyethylenediols, polyoxypropylenediols or polyoxybutylenediols.

Suitable polyether polyols, also known as polyoxyalkylenepolyols or oligoetherols are, for example, those which are polymerization products of ethylene oxide, 1,2-propylene oxide, 1,2- or 2,3-butylene oxide, oxetane, tetrahydrofuran or mixtures thereof, possibly polymerized with the aid of a starter molecule having two or more active hydrogen atoms, for example water, ammonia or compounds with a plurality of OH or NH groups, for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline and mixtures of the aforementioned compounds. It is possible to use either polyoxyalkylenepolyols which have a low degree of unsaturation (measured to ASTM D-2849-69 and reported in milliequivalents of unsaturation per gram of polyol (meq/g)), prepared, for example, with the aid of what are called double metal cyanide complex catalysts (DMC catalysts), or polyoxyalkylenepolyols with a higher degree of unsaturation, prepared, for example, with the aid of anionic catalysts such as NaOH, KOH, CsOH or alkali metal alkoxides.

Particularly suitable are polyoxyethylenepolyols and polyoxypropylenepolyols, for example, polyoxyethylenediols, polyoxypropylenediols, polyoxyethylenetriols and polyoxypropylenetriols.

Especially suitable are polyoxyalkylenediols or polyoxyalkylenetriols having a degree of unsaturation lower than 0.02 meq/g and having a molecular weight in the range from 1000 to 30 000 g/mol, and also polyoxyethylenediols, polyoxyethylenetriols, polyoxypropylenediols and polyoxypropylenetriols having a molecular weight of 400 to 8000 g/mol.

Likewise particularly suitable are what are called ethylene oxide-terminated ("EO-endcapped", ethylene oxide-endcapped) polyoxypropylenepolyols. The latter are specific polyoxypropylenepolyoxyethylenepolyols which are obtained, for example, by further alkoxylating pure polyoxypropylenepolyols, such as polyoxypropylenediols and -triols, with ethylene oxide after completion of the polypropoxylation reaction, and which thus have primary hydroxyl groups. Preference is given in this case, for example, to polyoxypropylenepolyoxyethylenediols and polyoxypropylenepolyoxyethylenetriols.

Additionally suitable are styrene-acrylonitrile-grafted polyetherpolyols, as commercially available, for example, under the Lupranol® tradename from Elastogran GmbH, Germany.

Especially suitable polyester polyols are polyesters which, for example, bear at least two hydroxyl groups and are prepared by known methods, such as by the polycondensation of hydroxycarboxylic acids or the polycondensation of aliphatic and/or aromatic polycarboxylic acids with di- or polyhydric alcohols.

Especially suitable are polyester polyols which are, for example, prepared from dihydric to trihydric alcohols, for example 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or their anhydrides or esters, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the aforementioned acids, and also polyester polyols from lactones, for example ε-caprolactone.

Polyester diols are particularly suitable, such as those prepared from adipic acid, azelaic acid, sebacic acid, dodecanedicarboxylic acid, dimer fatty acid, phthalic acid, isophthalic acid and terephthalic acid as dicarboxylic acid or from lactones, for example ε-caprolactone, and from ethylene glycol, diethylene glycol, neopentyl glycol, 1,4-butanediol, 1,6-hexanediol, dimer fatty acid diol and 1,4-cyclohexanedimethanol as dihydric alcohol.

Especially suitable as polycarbonate polyols are those of the kind obtainable by reaction, for example, of the above-mentioned alcohols used to form the polyester polyols with dialkyl carbonates such as dimethyl carbonate, diaryl carbonates such as diphenyl carbonate or phosgene. Polycarbonate diols are particularly suitable, such as amorphous polycarbonate diols.

Further suitable polyols are poly(meth)acrylate polyols.

Additionally suitable are poly-hydroxy-functional fats and oils, for example natural fats and oils, such as castor oil, or polyols—known as oleochemical polyols—obtained by chemical modification of natural fats and oils, the epoxy polyesters or epoxy polyethers obtained, for example, by epoxidation of unsaturated oils and subsequent ring opening with carboxylic acids or alcohols, or polyols obtained by hydroformylation and hydrogenation of unsaturated oils. In addition, these are polyols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are, for example, fatty acids and fatty alcohols, and also fatty acid esters, such as the methyl esters (FAME), which can be derivatized, for example, by hydroformylation and hydrogenation to hydroxy fatty acid esters.

Likewise suitable are additionally polyhydrocarbon polyols, also called oligohydrocarbonols, examples being polyhydroxy-functional ethylene-propylene, ethylene-butylene or ethylene-propylene-diene copolymers, of the kind produced, for example, by Kraton Polymers, USA, or polyhydroxy-functional copolymers of dienes such as 1,3-butadiene or diene mixtures and vinyl monomers such as styrene, acrylonitrile or isobutylene, or poly-hydroxy-functional polybutadiene polyols, examples being those which are prepared by copolymerizing 1,3-butadiene and allyl alcohol or by oxidizing polybutadiene and which may also have been hydrogenated.

Additionally suitable are poly-hydroxy-functional acrylonitrile/butadiene copolymers of the kind which can be prepared, for example, from epoxides or amino alcohols and carboxyl-terminated acrylonitrile/butadiene copolymers (available commercially under the name Hypro® CTBN from Emerald Performance Materials, LLC, USA).

These stated polyols preferably have, for example, an average molecular weight of 250 to 30 000 g/mol, more particularly of 1000 to 30 000 g/mol, and an average OH functionality in the range from 1.6 to 3.

In addition to these stated polyols, it is possible to use small amounts of low molecular weight dihydric or polyhydric alcohols, for example 1,2-ethanediol, 1,2- and 1,3-propanediol, neopentyl glycol, diethylene glycol, tri-ethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular weight alkoxylation products of the aforementioned dihydric and polyhydric alcohols, and also mixtures of the aforementioned alcohols, when preparing the polyurethane polymer having isocyanate groups.

For example, suitable polyols P are described in paragraphs [0029] to of US 2006/0122352 A1, the entire disclosure of which is hereby incorporated by reference.

More particularly, the free-radically polymerizable monomer M of the formula (III) is liquid at room temperature, which also includes viscous and highly viscous elastomers.

It is of course possible and can be advantageous to use mixtures of the above-described free-radically polymerizable monomers M.

The proportion of free-radically polymerizable monomer M is, for example, 10 to 90% by weight, especially 25 to 75% by weight, preferably 30 to 65% by weight, of the overall composition.

In addition, the composition comprises at least one free-radical former.

The free-radical former is, for example, a peroxide, a hydroperoxide or a perester. The free-radical former is most preferably dibenzoyl peroxide.

The composition can further comprise at least one catalyst for free-radical formation. This catalyst is for example a tertiary amine, a transition metal salt or a transition metal complex. For example, such suitable tertiary amines are aromatic amines, such as those selected from the group consisting of N,N-dimethylaniline, N,N-diethylaniline, N,N-bis(hydroxyalkyl)aniline such as N,N-bis(2-hydroxyethyl)aniline, N,N-alkylhydroxyalkylaniline such as N-ethyl-N-hydroxyethylaniline, N,N-dimethyl-p-toluidine, N,N-diethyl-p-toluidine, N-methyl-N-hydroxyethyl-p-toluidine, N,N-bis(2-hydroxyethyl)-p-toluidine and alkoxylated N,N-bis (hydroxyethyl)-p-toluidines, N-ethoxylated p-toluidine, N,N-bis(2-hydroxyethyl)xylidine, N-alkylmorpholine and mixtures thereof. Transition metal salts and transition metal complexes are, for example, salts and complexes of cobalt, nickel, copper, manganese or vanadium.

Preferred catalysts for free-radical formation are described, for example, in paragraphs [0041]-[0054] of US 2002/0007027 A1, the entire disclosure of which is hereby incorporated by reference.

The catalyst for free-radical formation is, for example, used in an amount of 0.01 to 2.5% by weight, especially of 0.1 to 2% by weight, based on the composition.

The free-radical formers used may, for example, also be molecules which form free radicals under the influence of heat or of electromagnetic radiation, which then lead to the polymerization of the composition. These can be thermally activable free-radical formers and photoinitiators.

Suitable thermally activable free-radical formers are those which are still sufficiently stable at room temperature but form free radicals at only slightly elevated temperature.

Photoinitiators refer to free-radical formers which form free radicals under the influence of electromagnetic radiation. Especially suitable is a photo-initiator which forms free radicals on irradiation with electromagnetic radiation of wavelength 230 nm to 400 nm and is liquid at room temperature. For example, such photoinitiators are selected from the group consisting of α-hydroxy ketones, phenyl glyoxylates, monoacylphosphines, diacylphosphines, phosphine oxides and mixtures thereof.

In addition, the composition can comprise at least one epoxy resin A which has an average of more than one epoxy group per molecule.

Suitable epoxy resins A are preferably, for example, epoxy resins of the formula (IV):

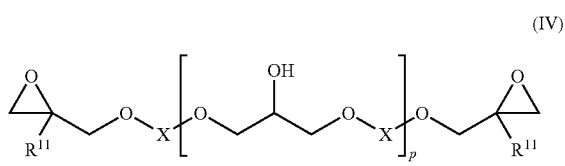

(IV)

In this formula, the $R^{11}$ radical is a hydrogen atom or a methyl group.

The index p is, for example, from 0 to 12, especially from 0 to 1, preferably from 0 to 0.2.

The epoxy resin A can be obtainable from the reaction of epichlorohydrin and/or 2-methylepichlorohydrin with a diphenol of the formula HO—X—OH. The X radical is in each case independently a divalent radical of a diphenol after removal of the two hydroxyl groups. Suitable diphenols are especially diphenols selected from the group consisting of 1,2-, 1,3- and 1,4-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl)sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)-hexahydro-4,7-methanoindane, phenolphthalein, fluorescein, 4,4'-[bis(hydroxyphenyl)-1,3-phenylenebis-(1-methylethylidene)] (=bisphenol M), 4,4'-[bis-(hydroxyphenyl)-1,4-phenylenebis(1-methylethylidene)] (=bisphenol P), 2,2'-diallyl bisphenol A, diphenols and dicresols prepared by reaction of phenols or cresols with diisopropylidenebenzene, and all isomers of the aforementioned compounds.

Further suitable epoxy resins A are also obtainable from the reaction of epichlorohydrin and/or 2-methylepichlorohydrin with an aminophenol of the formula $H_2N$—X—OH or with a dianiline of the formula $H_2N$—X—$NH_2$, where the X radical is as already described above. Examples of such epoxy resins are N,N,O-triglycidyl-p-aminophenol, N,N,O-triglycidyl-m-aminophenol, N,N,N',N'-tetraglycidyl-4,4'-diaminodiphenylmethane and N,N,$N^1$,N'-tetraglycidyl-4,4'-diaminodiphenylpropane.

Additionally preferably, the X radical represents bisphenol A or bisphenol F after removal of the two hydroxyl groups.

The epoxy resin A is preferably, for example, a liquid epoxy resin. In a further embodiment, the composition also comprises at least one solid epoxy resin in addition to the liquid epoxy resin. The index p in the solid epoxy resin represents values of, for example, >1, such as values of 1.5.

Exemplary preferred liquid epoxy resins are commercially available, for example, under the tradenames Araldite® GY 250, Araldite® PY 304 or Araldite® GY 282 from Huntsman International LLC, USA, or D.E.R.® 331 or D.E.R.® 330 from The Dow Chemical Company, USA, or under the tradename Epikote® 828 or Epikote® 862 from Hexion Specialty Chemicals Inc., USA.

Exemplary preferred solid epoxy resins are commercially available, for example, under the tradenames Araldite® GT 7071 or Araldite® GT 7004 from Huntsman International, LLC, USA. Further suitable solid epoxy resins are commercially available, for example, from The Dow Chemical Company, USA, or from Hexion Specialty Chemicals Inc., USA.

Additionally suitable as epoxy resins A are, for example, aliphatic polyepoxides of the formula (V) or (VI):

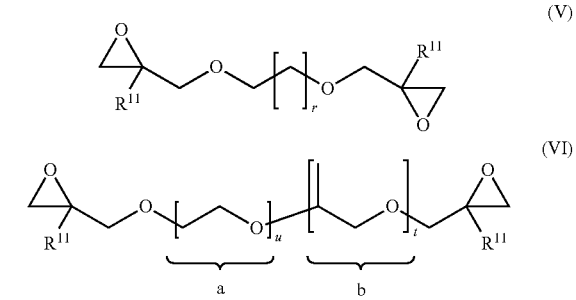

In these formulae, r is from, for example, 1 to 9, such as from 3 to 5. In addition, u is from, for example, 0 to 10 and t is from, for example, 0 to 10, with the proviso that the sum of u and t is ≧1. The $R^{11}$ radical has already been described above. Finally, "a" represents the structural element which originates from ethylene oxide, and b represents the structural element which originates from propylene oxide, where the units "a" and "b" may be arranged in blocks, alternately or randomly. Formula (VI) is thus, for example, (poly)ethylene glycol diglycidyl ether, (poly)propylene glycol diglycidyl ether and (poly)ethylene glycol/propylene glycol diglycidyl ether.

Exemplary suitable aliphatic or cycloaliphatic diglycidyl ethers are ethylene glycol diglycidyl ether, butanediol diglycidyl ether or hexanediol diglycidyl ether.

The proportion of epoxy resin A is for example, 5 to 40% by weight, such as 8 to 30% by weight, preferably 15 to 25% by weight, of the overall composition.

In addition, the composition comprises at least one compound of the formula (I) as described above.

Such compounds can be prepared, for example, by double alkoxylation of alkylamines or by single alkoxylation of N-alkylalkanolamines. For example, N-methyldiethanolamine is obtainable from the reaction of methylamine with ethylene oxide.

Suitable compounds of the formula (I) are, as well as N-methyldiethanolamine, for example, also N-methyldipropanolamine, N-methyldiisopropanolamine, N-butyldiethanolamine and the like.

An exemplary composition as disclosed herein can comprise at least one bifunctional monomer L which is reactive both toward the free-radically polymerizable monomer M and toward the epoxy resin A.

Such bifunctional monomers L are, for example, selected from the group consisting of glycidyl (meth)acrylate, α,β-unsaturated carboxylic acids such as (meth)acrylic acid, α,β-unsaturated dicarboxylic acids, 2-(meth)acrylamido-2-methylpropanesulfonic acid, maleic anhydride, partly hydrogenated phthalic anhydride and (meth)acrylates of the formula (VII):

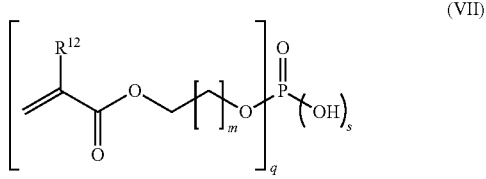

In this formula, the $R^{12}$ radical is either a hydrogen atom or a methyl group. The index m is from, for example, 1 to 15, such as from 1 to 5, preferably from, for example, 1 to 3. The index q is from, for example, 1 to 3 and the index is 3 minus q. More particularly, such (meth)acrylates of the formula (VII) are partial phosphoric esters of 2-hydroxyethyl (meth)acrylate.

Preference is given to bifunctional monomers which are reactive toward the epoxy resin A at room temperature. The bifunctional monomer L is most preferably glycidyl (meth)acrylate.

The proportion of bifunctional monomer L is, for example, 1 to 30% by weight, such as 5 to 20% by weight, preferably 7 to 15% by weight, of the overall composition.

The composition may additionally comprise at least one adhesion promoter, especially a (meth)acrylic acid, a metal (meth)acrylate or a (meth)acrylate of the formula (VII) as described above.

Exemplary preferred metal (meth)acrylates are metal (meth)acrylates of calcium, magnesium or zinc which have a hydroxyl group and/or (meth)acrylic acid or (meth)acrylate as a ligand or anion. Particularly preferred metal (meth)acrylates are zinc di(meth)-acrylate, calcium di(meth)acrylate, Zn(OH)(meth)acrylate and magnesium di(meth)acrylate.

Exemplary preferred (meth)acrylates of the formula (VII) are 2-methacryloyloxyethyl phosphate, bis(2-methacryloyloxyethyl)phosphate and tris(2-methacryloyloxyethyl)phosphate, and mixtures thereof.

Further suitable adhesion promoters are silanes, such as organofunctional silanes. Exemplary suitable in this context are (meth)acryloyloxyalkyltrialkoxysilanes such as 3-methacryloyloxypropyl-trimethoxysilane, glycidyloxyalkyltrialkoxysilanes such as 3-glycidoxypropyltrimethoxysilane, and the like. For example, such suitable silanes are available under the Dynasylan® MEMO tradename from Evonik Degussa GmbH, Germany, or under the Silquest® A-187 tradename, Momentive Performance Materials Inc., USA.

The proportion of any adhesion promoter present in the overall composition is, for example, 0.01 to 12% by weight, such as 0.5 to 8% by weight.

The composition may additionally comprise at least one core-shell polymer. Core-shell polymers can consist of an elastic core polymer and a rigid shell polymer. Particularly suitable core-shell polymers can consist of a rigid shell of a rigid thermoplastic polymer which has been grafted onto a core of crosslinked elastic acrylate or butadiene polymer.

Exemplary suitable core-shell polymers are those which swell but do not dissolve in the free-radically polymerizable monomer M.

Exemplary preferred core-shell polymers are those known as MBS polymers, which are commercially available, for example, under the Clearstrength® tradename from Arkema Inc., USA, or Paraloid® tradename from Rohm and Haas, USA. The core-shell polymers are used in an amount of, for example, 0.01 to 30% by weight, such as 10 to 20% by weight, based on the overall composition.

The composition may comprise additional solid or liquid toughness improvers. A "toughness improver" is understood here and hereinafter to mean an addition to a polymer matrix which, even in the case of small additions of, for example, 0.1 to 15% by weight, such as 0.5 to 8% by weight, based on the total weight of the composition, brings about a significant increase in toughness and is therefore capable of absorbing higher flexural, tensile, impact or shock stress before the matrix tears or fractures.

In addition to the above-described core-shell polymers, suitable solid toughness improvers are, for example, organic ion-exchanged layer minerals, as known to those skilled in the art by the terms "organoclay" or "nanoclay"; polymers or block copolymers, such as of the monomers styrene, butadiene, isoprene, chloroprene, acrylonitrile and methyl methacrylate, and chloro-sulfonated polyethylene; and amorphous silicon dioxide.

Suitable liquid toughness improvers are liquid rubbers as commercially available under the Hypro® CTBN, ETBN or VTBN tradenames from Emerald Performance Materials, LLC, USA, and epoxy resin-modified liquid rubbers of the Hypro® CTBN type.

The composition may additionally comprise at least one filler. Exemplary suitable fillers are natural, ground or precipitated calcium carbonates (chalks) which have optionally been coated with fatty acids, especially stearates, montmorillonites, bentonites, barium sulfate ($BaSO_4$, also called barite or heavy spar), calcined kaolins, quartz flour, aluminum oxides, aluminum hydroxides, silicas, especially fumed silicas, modified castor oil derivatives and polymer powders or polymer fibers. Preference is given, for example, to calcium carbonates, coated calcium carbonates being most preferred.

The filler can be used in an amount of, for example, 0.01 to 30% by weight, such as 10 to 30% by weight, preferably 15 to 20% by weight, based on the overall composition.

The composition may additionally comprise at least one reactive diluent G having epoxy groups. These reactive diluents G are for example, glycidyl ethers of monofunctional saturated or unsaturated, branched or unbranched, cyclic or open-chain alcohols having 4 to 30 carbon atoms, for example butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether and the like. Additionally suitable are glycidyl ethers of difunctional saturated or unsaturated, branched or unbranched, cyclic or open-chain alcohols having 2 to 30 carbon atoms, for example ethylene glycol glycidyl ether, butanediol glycidyl ether, hexanediol glycidyl ether, octanediol glycidyl ether, cyclohexanedimethanol diglycidyl ether, neopentyl glycol diglycidyl ether and the like. Likewise suitable are glycidyl ethers of tri- or polyfunctional, saturated or unsaturated, branched or unbranched, cyclic or open-chain alcohols such as epoxidized castor oil, epoxidized trimethylolpropane, epoxidized pentaerythritol, or polyglycidyl ethers of aliphatic polyols such as sorbitol, glycerol, trimethylolpropane and the like. Additionally suitable are glycidyl ethers of phenol and aniline compounds, such as phenyl glycidyl ether, cresyl glycidyl ether, p-tert-butylphenyl glycidyl ether, nonylphenol glycidyl ether, 3-n-pentadecenyl glycidyl ether (from cashewnut shell oil), N,N-diglycidylaniline and the like.

Suitable reactive diluents G are additionally epoxidized amines such as N,N-diglycidylcyclohexylamine and the like; epoxidized mono- or dicarboxylic acids such as glycidyl neodecanoate, glycidyl methacrylate, glycidyl benzoate, diglycidyl phthalate, diglycidyl tetrahydrophthalate and diglycidyl hexahydrophthalate, diglycidyl esters of dimeric fatty acids and the like; and epoxidized di- or trifunctional, low to high molecular weight polyether polyols such as polyethylene glycol diglycidyl ether, polypropylene glycol diglycidyl ether and the like.

Exemplary preference is given to hexanediol diglycidyl ether, cresyl glycidyl ether, p-tert-butylphenyl glycidyl ether, polypropylene glycol diglycidyl ether and polyethylene glycol diglycidyl ether.

The proportion of the reactive diluent G having epoxy groups is, for example, 0.5 to 20% by weight, preferably 1 to 8% by weight, based on the total weight of the composition.

The composition may optionally comprise additional constituents. Such additional constituents are, for example toughness modifiers, dyes, pigments, inhibitors, UV and heat stabilizers, metal oxides, antistats, flame retardants, biocides, plasticizers, waxes, leveling agents, adhesion promoters, thixotropic agents, spacers, and further customary raw materials and additives known to those skilled in the art.

The composition is, for example, a two-pack composition, wherein two packs K1 and K2 are stored separately from one another until application. The first pack K1 can include the free-radically polymerizable monomer M, the compound of the formula (I) and any bifunctional monomer L present. The second pack K2 includes, for example, the free-radical former and the epoxy resin A.

In addition, in a two-pack composition, it is also possible to store other constituents separately, such as those which would impair the storage stability of the composition by reaction with one another.

In exemplary two-pack compositions described, pack K1 comprises the constituents of free-radically polymerizable monomers M, compounds of the formula (I), catalysts for free-radical formation, bifunctional monomers L, adhesion promoters and fillers, and pack K2 comprises the constituents of epoxy resin A, free-radical former and fillers. The volume ratio in the mixing of K1 with K2 is, for example, in the range from 1:1 to 10:1.

In certain cases, it can be advantageous to color the two packs K1 and K2 differently. This allows the mixing quality to be checked when the packs are mixed, and mixing errors to be recognized at an early stage. It is likewise possible by virtue of this measure to check qualitatively whether the mixing ratio intended has been complied with.

Such a two-pack composition can be stored in packaging which has two separate chambers. In this case, pack K1 is present in one chamber and pack K2 in the other chamber of the packaging. Examples of suitable packaging include double cartridges, such as twin or coaxial cartridges, or multichamber tubular pouches with an adapter. The two packs K1 and K2 are, for example, mixed with the aid of a static mixer, which can be applied to the packaging comprising two chambers.

Such suitable packaging is described, for example, in US 2006/0155045 A1, WO 2007/096355 A1 and US 2003/0051610 A1, the entire disclosure of which is hereby incorporated by reference.

In an industrial scale plant, the two packs K1 and K2 can be stored separately from one another in drums or hobbocks and, on application, squeezed out and mixed, for example by means of gear pumps. The composition can be applied to a substrate manually or in an automated process by means of robots.

Exemplary compositions as disclosed herein can be cured firstly by a free-radical polymerization reaction of the free-radically polymerizable monomers M and if appropriate further free-radically polymerizable constituents in the composition, and secondly by a homopolymerization reaction of the epoxy resin A under the influence of the compound of the formula (I).

The progress, such as the rate, of the two reactions which lead to curing of the composition can be adjusted by the selection of the constituents used. For example, the curing of the composition proceeds in two stages. In a first step, the free-radical polymerization reaction proceeds, as a result of which the composition already receives a high early strength at an early stage. In a second step, the slower homopolymerization of the epoxy resin proceeds. As a result, the composition continues to cure and receives its high final strength.

In exemplary preferred embodiments, the compound of the formula (I) present in the composition is a bifunctional monomer, which means that $R^2$ and/or $R^9$ is a radical of the formula (II), and it is thus reactive both toward the free-radically polymerizable monomer M and toward the epoxy resin A.

The composition is curable especially at room temperature (e.g., at a temperature in the region of 23° C.). It is of course clear to those skilled in the art that the composition can also be cured at elevated temperatures, but curing at room temperature can be preferred.

The disclosure further relates to the use of a composition as described above as an adhesive, sealant or as a coating. For example, exemplary compositions are suitable for adhesive bonding, sealing or coating of substrates with which no heat-curing adhesives, sealants and coatings can be used for material-related and/or operational reasons. The reason for this may, for example, be that substrates to be adhesive bonded, sealed or coated could be impaired if they are exposed to elevated temperatures which are often needed to cure known compositions comprising epoxy resin. Such substrates are, for example, polymers such as polyethylene, polypropylene, polyvinyl chloride and polymethyl (meth)acrylate, and also painted substrates.

The substrate to whose surface the composition is applied may have been treated beforehand with suitable pretreatment agents or detergents. Such pretreatments include physical and/or chemical cleaning processes, for example grinding, sandblasting, brushing or the like, or treatment with detergents or solvents, or flame treatment or plasma treatment, such as an air plasma treatment at atmospheric pressure.

A particularly suitable method is pretreatment or cleaning of the substrates with Sika® Cleaner P or Sika® ADPrep, which are commercially available from Sika Schweiz AG.

Exemplary compositions as disclosed herein can be used especially in a process for bonding two substrates S1 and S2, comprising:
  i) applying a composition as described above to a substrate S1;
  ii) contacting the composition applied with a second substrate S2 within the open time; or i') applying a composition as described above to a substrate S1;
ii') applying a composition as described above to a substrate S2;
iii') joining the two substrates S1 and S2 to which composition has been applied within the open time.

The second substrate S2 comprises (e.g., consists of) the same material as or a different material than the substrate S1. In the case of a two-pack composition, step i), or i') and ii'), is preceded by the at least partial mixing of the two packs.

Likewise possible is a process for bonding two substrates S1 and S2, comprising:
i") applying a pack K1 as described above to a substrate S1;
ii") applying a pack K2 as described above to a substrate S2;
iii") joining the two substrates S1 and S2 each coated with one pack K1 or K2.

In such a process, the two packs K1 and K2 mix when the substrates are joined. This process can be suitable in the case of adhesive bonds by means of very thin adhesive layers.

Exemplary compositions as disclosed herein can be used in a process for sealing or for coating a substrate S1, comprising:
i''') applying a composition as described above to a substrate S1;
ii''') curing the composition.

In the case of a two-pack composition, step i''') is preceded by the at least partial mixing of the two packs.

The present disclosure further encompasses a cured composition which is obtainable from an above-described composition by a curing process. For example, the composition is a two-pack composition, and so the cured composition is obtainable by at least partial mixing of the two packs K1 and K2. For example, the curing process proceeds at room temperature.

The disclosure likewise encompasses articles which have been adhesive bonded, sealed or coated by an above-described process. These articles are for example built structures, such as built structures in construction or civil engineering, or industrial goods or consumer goods, such as windows, domestic appliances, tools or modes of transport, such as a water or land vehicle, for example, an automobile, a bus, a truck, a train or a ship. Such articles are also installable components of industrial goods or modes of transport, such as also modular parts which are used as modules on the production line and are especially attached or inserted by adhesive bonding. These prefabricated installable components can be used in the construction of modes of transport. For example, such installable components are drivers' cabins of trucks or of locomotives, or sliding roofs on automobiles. These articles are for example, windows and doors, as used in built structures.

The disclosure further encompasses the use of a compound of the formula (I) as described above as a hardening agent for compositions which comprise both at least one epoxy resin and at least one free-radically polymerizable monomer. For example, the $R^2$ and/or $R^9$ radicals in the compound of the formula (I) are radicals of the formula (II). The compound of the formula (I) is thus a bifunctional compound or a bifunctional monomer which serves as a hardening agent for the epoxy resin, and can be incorporated, and can be indeed incorporated, into the polymer matrix as a free-radically polymerizable monomer. The compound of the formula (I) can be used for this purpose because it initiates or promotes the homopolymerization of the epoxy resin but does not impair the free-radical polymerization reaction.

EXAMPLES

Working examples are adduced below, which are intended to explain the disclosure described in detail. The disclosure is of course not restricted to these working examples described.

Preparation of
2-hydroxy-3-((2-hydroxyethyl)(methyl)amino)propyl methacrylate "M1"

10.0 g (133.1 mmol) of 2-(methylamino)ethanol and 85 g of tetrahydrofurfuryl methacrylate were weighed into a 250 ml three-neck flask with magnetic stirrer bar, thermometer and reflux condenser. At room temperature, 19.5 g (137.1 mmol) of glycidyl methacrylate were slowly added dropwise while stirring constantly. In the course of this, slight exothermicity was observed, but the temperature never exceeded 70° C. After stirring at 70° C. for 6 hours, it was possible to detect only small traces of 2-(methylamino)ethanol by means of a gas chromatograph. This approx. 25% product solution in tetrahydrofurfuryl methacrylate was transferred into a glass bottle and used in the model formulations without further workup.

Production of the Compositions

The following compositions were produced:
As pack K1, the constituents listed in table 1 were mixed with one another in the proportions by weight specified in a dissolver at a temperature of not more than 80° C., and stirred until a macroscopically homogeneous paste was obtained.

As pack K2, the constituents listed in table 1 were mixed with one another in the proportions by weight specified in a dissolver.

The packs K1 and K2 produced were introduced into the separate chambers of coaxial cartridges and, on application, mixed by means of a static mixer.

Description of the Test Methods

Tensile strength, elongation at break and modulus of elasticity were determined to DIN EN 53504 (pulling speed: 200 mm/min) on films with a layer thickness of 2 mm, which cured under standard climatic conditions (23±1° C., 50±5% relative air humidity). The samples were tested directly and continuously after production thereof.

Modulus of elasticity is reported in the range of 0.5 to 1% strain.

TABLE 1

|  |  | 1 | 2 | 3 | Ref1 | Ref2 | Ref3 |
|---|---|---|---|---|---|---|---|
| K1 | Tetrahydro-furfuryl methacrylate | 58.3 | 34.3 | 36.3 | 59 | 41.5 | 36.3 |
|  | Diethylene glycol dimethacrylate |  | 2 | 2 |  | 2 | 2 |
|  | Glycidyl methacrylate |  | 10.7 |  |  |  |  |
|  | N-Methyl- | 0.7 | 2 |  |  |  |  |

TABLE 1-continued

|  |  | 1 | 2 | 3 | Ref1 | Ref2 | Ref3 |
|---|---|---|---|---|---|---|---|
| | diethanolamine M1 | | | 10.7 | | | |
| | Diethylamino-ethyl methacrylate | | | | | 5 | 10.7 |
| | Hypro ® VTBNX 1300 × 33 | 13 | 15 | 12 | 13 | 12 | 12 |
| | Core-shell polymer | 16 | 12 | 15 | 16 | 15 | 15 |
| | Catalyst[a] | 1.5 | 1.5 | 1.5 | 1.5 | 1.5 | 1.5 |
| K2 | Araldite ® GY 250 | 8 | 20 | 20 | 8 | 20 | 20 |
| | Dibenzoyl peroxide[b] | 2.5 | 2.5 | 2.5 | 2.5 | 3 | 2.5 |
| Tensile strength [MPa] | 1 h | 9.08[c] | 4.26 | 4.51 | 8.27 | 3.3 | n.d. |
| | 7 d | 8.90 | 7.41 | 14.3 | 8.78 | 5.97 | n.d. |
| | 14 d | 9.35 | 9.89 | 25.5 | 8.24 | n.d. | n.d. |
| | 28 d | 10.01 | 14.66 | 26.3 | 8.59 | 12.58 | n.d. |
| Modulus of elasticity [MPa] | 1 h | 57[c] | 11 | 14 | 65 | 4 | n.d. |
| | 7 d | 64 | 90 | 470 | 55 | 21 | n.d. |
| | 14 d | 89 | 234 | 932 | 39 | n.d. | n.d. |
| | 28 d | 119 | 470 | 912 | 43 | 396 | n.d. |
| Elongation at break in % | 1 h | 238[c] | 166 | 99 | 247 | 157 | n.d. |
| | 7 d | 225 | 151 | 35 | 245 | 170 | n.d. |
| | 14 d | 222 | 117 | 6 | 233 | n.d. | n.d. |
| | 28 d | 221 | 69 | 7 | 238 | 79 | n.d. |

Compositions 1 to 3 and reference examples Ref1 to Ref3 in proportions by weight and the results;
[a]Catalyst for free-radical formation (tertiary amine based on toluidine);
[b]40% by weight in plasticizer;
[c]The measurements were carried out after 3 h;
n.d.: not determined; in example Ref3, no curing occurred.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A composition comprising:
    a) at least one free-radically polymerizable monomer M;
    b) at least one free-radical former;
    c) at least one epoxy resin A which has an average of more than one epoxy group per molecule; and
    d) at least one compound of the formula (I)

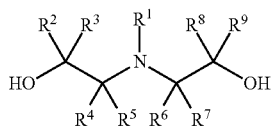

where the $R^1$ radical is a hydrocarbyl radical having 1 to 6 carbon atoms;

the $R^3$, $R^4$, $R^5$, $R^6$, $R^7$ and $R^8$ radicals are each independently a hydrogen atom or a hydrocarbyl radical having 1 to 6 carbon atoms; and the $R^2$ and $R^9$ radicals are each independently a hydrogen atom or a hydrocarbyl radical having 1 to 6 carbon atoms or a radical of the formula (II)

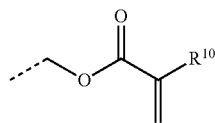

where the $R^{10}$ radical is a hydrogen atom or a methyl group, wherein the $R^2$ and/or $R^9$ radicals are a radical of the formula (II).

2. The composition as claimed in claim 1, wherein the free-radically polymerizable monomer M is a methacrylate.

3. The composition as claimed in claim 1, wherein the proportion of the free-radically polymerizable monomer M is 10 to 90% by weight of the overall composition.

4. The composition as claimed in claim 1, wherein the free-radical former is a peroxide, a hydroperoxide or a perester.

5. The composition as claimed in claim 1, comprising:
    at least one tertiary amine or a transition metal salt or a transition metal complex as a catalyst for free-radical formation.

6. The composition as claimed in claim 1, wherein the epoxy resin A is obtained from a reaction of epichlorohydrin and/or 2-methylepichlorohydrin with a diphenol.

7. The composition as claimed in claim 1, wherein the proportion of the epoxy resin A is 5 to 40% by weight of the overall composition.

8. The composition as claimed in claim 1, comprising:
    at least one bifunctional monomer L which is reactive both toward the free-radically polymerizable monomer M and toward the epoxy resin A.

9. The composition as claimed in claim 8, wherein the bifunctional monomer L is glycidyl (meth)acrylate.

10. The composition as claimed in claim 1, formed as a two-pack composition comprising:
    a first pack K1 having the free-radically polymerizable monomer M, the compound of the formula (I) and any bifunctional monomer L present; and a second pack K2 having the free-radical former and the epoxy resin A.

11. The composition as claimed in claim 1, wherein the composition is curable at room temperature.

12. The composition as claimed in claim 1, configured as an adhesive or sealant or as a coating.

13. The composition as claimed in claim 1, wherein the free-radically polymerizable monomer is selected from the group consisting of methyl methacrylate (MMA), tetrahydrofurfuryl methacrylate (THFMA), cyclohexyl methacrylate (CHMA), isobornyl methacrylate (IBMA) and trimethylcyclohexyl methacrylate (TMCHMA).

14. The composition as claimed in claim 1, wherein the proportion of the free-radically polymerizable monomer M is 25 to 78% by weight of the overall composition.

15. The composition as claimed in claim 1, wherein the proportion of the free-radically polymerizable monomer M is 30 to 65% by weight of the overall composition.

16. The composition as claimed in claim 1, wherein the free-radical former is dibenzoyl peroxide.

17. The composition as claimed in claim 1, wherein the proportion of the epoxy resin A is 8 to 30% by weight of the overall composition.

18. The composition as claimed in claim 1, wherein the proportion of the epoxy resin A is 15 to 25% by weight of the overall composition.

19. The composition as claimed in claim 6, wherein the diphenol is selected from the group consisting of 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl) sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)-hexahydro-4,7-methanoindane, phenolphthalein, fluorescein, 4,4'-[bis(hydroxyphenyl)-1,3-phenylenebis(1-methylethylidene)] (=bisphenol M), 4,4'-[bis(hydroxyphenyl)-1,4-phenylenebis(1-methylethylidene)] (=bisphenol P), 2,2'diallyl bisphenol A, diphenols and dicresols prepared by reaction of phenols or cresols with diisopropylidenebenzene, and all isomers of the aforementioned compounds.

20. A composition comprising:
    a) at least one free-radically polymerizable monomer M;
    b) at least one free-radical former;
    c) at least one epoxy resin A which has an average of more than one epoxy group per molecule; and
    d) at least one compound of the formula (I)

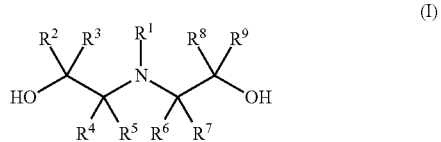

where the $R^1, R^2, R^3, R^4, R^5, R^6, R^7, R^8$ and $R^9$ radicals are each independently an ethyl or a methyl group.

21. A method for curing the composition as claimed in claim 10, the method comprising combining the first pack K1 with the second pack K2.

* * * * *